US008863118B2

(12) United States Patent
Ohsawa

(10) Patent No.: US 8,863,118 B2
(45) Date of Patent: Oct. 14, 2014

(54) TASK MANAGEMENT APPARATUS AND COMPUTER READABLE MEDIUM FOR SELECTING A TASK LOCATION AND TASK CANDIDATE

(75) Inventor: Takashi Ohsawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 161 days.

(21) Appl. No.: 13/036,047

(22) Filed: Feb. 28, 2011

(65) Prior Publication Data

US 2012/0054757 A1 Mar. 1, 2012

(30) Foreign Application Priority Data

Aug. 25, 2010 (JP) ................................. 2010-188894

(51) Int. Cl.
*G06F 9/455* (2006.01)
*G06Q 10/06* (2012.01)

(52) U.S. Cl.
CPC ...................................... *G06Q 10/06* (2013.01)
USPC ........................................................... 718/1

(58) Field of Classification Search
None
See application file for complete search history.

(56) References Cited

U.S. PATENT DOCUMENTS

| 7,765,028 | B2 * | 7/2010 | Orita ............................. 700/248 |
| 2008/0162242 | A1 * | 7/2008 | Schneur et al. .................... 705/9 |
| 2009/0177503 | A1 * | 7/2009 | Kawano et al. ..................... 705/5 |
| 2009/0249350 | A1 * | 10/2009 | Senders et al. ................ 718/104 |

FOREIGN PATENT DOCUMENTS

| JP | 2004-102175 A | 4/2004 |
| JP | 2008-171068 A | 7/2008 |

* cited by examiner

*Primary Examiner* — Gregory A Kessler
(74) *Attorney, Agent, or Firm* — Sughrue Mion, PLLC

(57) ABSTRACT

A task management apparatus includes a task information acquisition unit, an execution location position information acquisition unit, an execution candidate position information acquisition unit and a selection unit. The task information acquisition unit acquires task information for a task being executed by one of a plurality of execution candidates at one of a plurality of execution locations. The execution location position information acquisition unit acquires execution location position information for respective positions of the execution locations. The execution candidate position information acquisition unit acquires execution candidate position information on respective positions of the execution candidates. The selection unit selects one execution location and one execution candidate from the plurality of execution locations and the plurality of execution candidates, respectively, based on respective movement costs which are calculated from the acquired execution location position information and the acquired execution candidate position information.

14 Claims, 3 Drawing Sheets

FIG. 2

| TASK ID | EXECUTION DATE | CONDITION ON EXECUTION DATE | TERM | TASK OWNER | TASK CONTENTS | EXECUTOR | EXECUTION CANDIDATE | EXECUTION LOCATION | EXECUTION LOCATION CANDIDATE | SELECTION MODE |
|---|---|---|---|---|---|---|---|---|---|---|
| 0010 | 2010/8/1 10:00 | — | — | A | COMMODITY CONFERENCE | A,B,C | — | CONFERENCE ROOM A | — | — |
| 0011 | 2010/8/1 14:00 | — | — | A | REVIEW | A,C,D | — | CONFERENCE ROOM B | — | — |
| 0015 | — | — | 2010/9/10 | A | DOCUMENT RECEIPT MAGAZINE PURCHASE | — | A,B,C,D | — | BOOKSTORE, CONVENIENCE STORE | MOVEMENT DISTANCE |
| 0016 | — | 9:00 ~ 17:00 | 2010/8/2 | A | DOCUMENT RECEIPT | — | A,B,C,G | HEAD OFFICE RECEIPT | — | MOVEMENT TIME |
| 0017 | — | — | 2010/8/5 | A | PRINT | — | A,B,C | — | CONVENIENCE STORE | MOVEMENT TIME |
| 0019 | — | 8:00 ~ 15:00 | 2010/8/31 | A | DEPOSIT | — | — | — | BANK | MOVEMENT TIME |
| 0020 | — | — | — | A | | — | — | — | | — |

TASK MANAGEMENT APPARATUS AND COMPUTER READABLE MEDIUM FOR SELECTING A TASK LOCATION AND TASK CANDIDATE

CROSS-REFERENCE TO RELATED APPLICATION

This application is based on and claims priority under 35 USC 119 from Japanese Patent Application No. 2010-188894 filed on Aug. 25, 2010.

BACKGROUND

1. Technical Field

The present invention relates to a task management apparatus and a computer-readable medium.

2. Related Art

There is a schedule management system in which a server manages schedule information, of a group or group members, that is input from a portable terminal or the like carried by a group member through a network. A group member confirms his/her own schedule or schedules of other group members with reference to the schedule information using the portable terminal or the like connected to the network.

SUMMARY

According to an aspect of the invention, a task management apparatus includes a task information acquisition unit, an execution location position information acquisition unit, an execution candidate position information acquisition unit and a selection unit. The task information acquisition unit acquires task information which indicates a task being to be executed by one of a plurality of execution candidates at one of a plurality of execution locations. The execution location position information acquisition unit acquires execution location position information which indicates respective positions of the plurality of execution locations. The execution candidate position information acquisition unit acquires execution candidate position information on respective positions of the plurality of execution candidates. The selection unit selects one execution location at which the task which is indicated by the task information is executed and one execution candidate who executes the task from the plurality of execution locations and the plurality of execution candidates, respectively, based on respective movement costs of the plurality of execution candidates with respect to the plurality of execution locations. The movement costs are calculated from the execution location position information acquired by the execution location position information acquisition unit and the execution candidate position information acquired by the execution candidate position information acquisition unit.

BRIEF DESCRIPTION OF THE DRAWINGS

Exemplary embodiments of the invention will be described in detail based on the following figures, wherein:

FIG. 2 is a diagram illustrating an example of task information that is stored in a task information database.

DETAILED DESCRIPTION

Hereinafter, a preferred embodiment (hereinafter referred to as an "embodiment") for carrying out the invention will be described with reference to the drawings.

Figure 1:
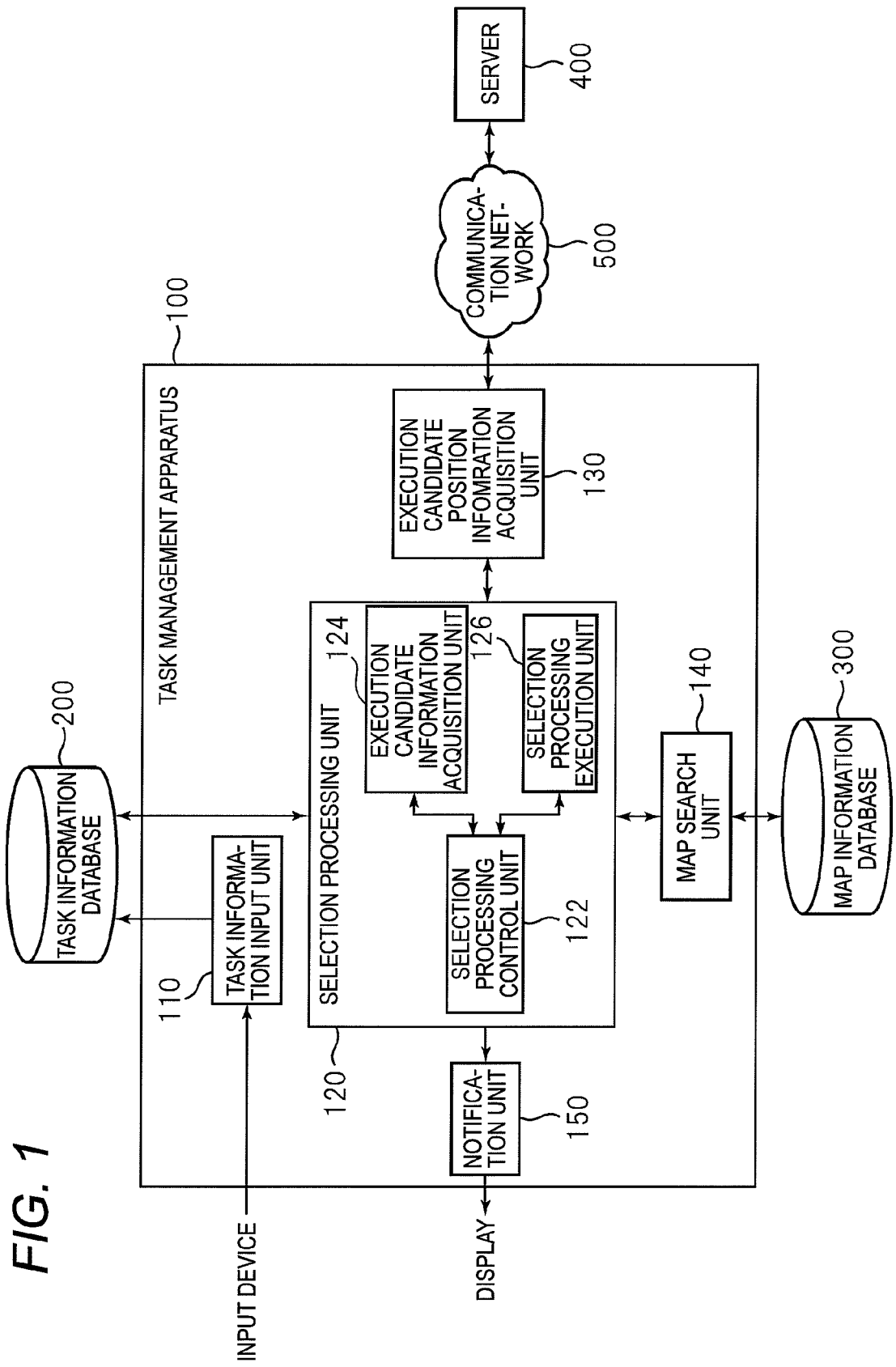
FIG. 1 is a diagram illustrating the configuration of a task management apparatus according to an embodiment of the invention.

FIG. 1 is a diagram illustrating the configuration of a task management apparatus 100 according to an embodiment of the invention. The task management apparatus 100, for example, is an information processing apparatus such as a desktop computer, a notebook computer, or the like. The task management apparatus 100 is connected to a task information database 200 and a map information database 300 by wire or wirelessly. Also, the task management apparatus 100 is connected to a server 400 through a communication network 500.

The task management apparatus 100 performs selection of an execution location at which a task is executed and an execution candidate that performs the task with respect to the task that is executed by any one of a plurality of execution candidates at any one of a plurality of execution locations, which have been registered in a task information database 200 by a task owner, and notifies the task owner of the selected execution location and execution candidate. Examples of such tasks include deposits and withdrawals of money in a financial agency, printing of print data registered on a network through any one of printing devices which are connected to the network and are dotted about respective branches, and the like.

In the task information database 200, task information on respective tasks that are managed by the task management apparatus 100 is stored. The task information database 200 is implemented by a hard disk or the like. The task information includes items of a task ID, an execution date of a task, a condition on an execution date, a term, a task owner, task contents, an executor, an execution candidate, an execution location, an execution location candidate, an selection mode of selection processing to be described later, and the like, and at least a portion of the items is stored with respect to the respective tasks. FIG. 2 is a diagram illustrating an example of task information that is stored in the task information database 200. The task information is input by the task owner to the task information database 200 through a task information input unit 110 to be described later. Here, execution location candidates "bookstore", "convenience store", and "bank" do not indicate one specified location, respectively, but the "bookstore" indicates store positions of plural bookstores, the "convenience store" indicates store positions of plural convenience stores, and the "bank" indicates store positions of plural banks.

The map information database 300 stores map information within a predetermined range. The map information of a predetermined range is map information that includes the range in which schedules that are managed by the task management apparatus 100 can be executed, and for example, in the case where the task management apparatus 100 manages schedules that are executed in a certain district, it means the map information of the district. Also, the map information includes information that indicates locations (positions of banks, installation positions of printers, and the like) that are designated as the execution location candidates in the task information. The map information database 300 is implemented by a hard disk or the like.

The server 400 is a communication device that is connected to the task management apparatus 100 through the communication network 500 to perform communication. Also, the server 400 performs communication with portable terminals that are carried by execution candidates.

Hereinafter, the task management apparatus 100 will be described. The task management apparatus 100 selects an execution location at which the task is executed and an execution candidate that executes the task based on movement costs of the respective execution candidates with respect to the respective execution locations, which are calculated from the execution location position information and the execution candidate position information. Here, the movement cost means the amount of load that is required for the execution candidate to move up to the execution location, and specifically, may be a movement distance, a movement time, a movement expense, fuel required for the movement, and the like. In this embodiment of the invention, as the movement cost, a distance (movement distance) from the execution candidate to the execution location that is nearest to the execution candidate, or a time (movement time) that is required for the execution candidate to move up to the execution location that is nearest to the execution candidate is used. Whether to use the movement distance or the movement time as the movement cost is designated by a selection mode that is included in the task information set by the task owner (see FIG. 2). That is, in the movement distance mode, selection of the execution location and the execution candidate is performed based on the movement distance, and in the movement time mode, selection of the execution location and the execution candidate is performed based on the movement time.

The task management apparatus 100 includes a task information input unit 110, a selection processing unit 120, an execution candidate position information acquisition unit 130, a map search unit 140, and a notification unit 150. The task information input unit 110, the selection processing unit 120, the execution candidate position information acquisition unit 130, the map search unit 140, and the notification unit 150 are implemented, for example, by one function of a CPU.

The task information input unit 110 is input by the task owner through an input device such as a keyboard (not illustrated) or the like. The task information input unit 110 receives the task information as illustrated in FIG. 2, and outputs the received task information to the task information database 200.

The selection processing unit 120 performs selection processing of the execution location and the execution candidate (hereinafter referred to as "selection processing") based on an input from the map search unit 140. The selection processing unit 120 includes a selection processing control unit 122, an execution candidate information acquisition unit 124, and a selection processing execution unit 126. The selection processing control unit 122 controls the selection processing that is performed by the selection processing unit 120. The execution candidate information acquisition unit 124 acquires information that indicates the execution candidate (execution candidate information) among the task information that is stored in the task information database 200, and outputs the acquired information to the execution candidate position information acquisition unit 130. The selection processing execution unit 126 performs the selection processing based on the map search result (the movement distance in the movement distance mode, and the movement time in the movement time mode) that is input from the map search unit 140. The operation of the selection processing unit 120 will be described later.

The execution candidate position information acquisition unit 130 acquires execution candidate position information on the respective positions of the execution candidates, which is designated by the execution candidate information that is input from the execution candidate information acquisition unit 124 of the selection processing unit 120, from the server 400, and outputs the acquired information to the selection processing unit 120.

The map search unit 140 acquires the execution candidate position information acquired by the execution candidate position information acquisition unit 130 from the selection processing unit 120, and acquires the execution location position information from the map information database 300. Also, the map search unit 140, based on this, acquires the movement distance (movement distance mode) from each execution candidate to the execution location that is nearest to the execution candidate or the movement time (movement time mode) that is required for each execution candidate to move up to the execution location that is nearest to the execution candidate, and outputs the result of the map search to the selection processing unit 120.

The notification unit 150 displays the information that indicates the execution time and the execution candidate, which are selected by the selection processing execution unit 126 of the selection processing unit 120, on a display (not illustrated). The task owner recognizes the selected execution location and execution candidate from the information that is displayed on the display, notifies the execution location to the execution candidate, and then requests the task from the execution candidate.

Hereinafter, the selection process in the task management apparatus 100 will be described in detail. The selection processing control unit 122 of the selection processing unit 120 recognizes the task information among the task information stored in the task information database 200 at a predetermined point in time (for example, at intervals of one minute), of which the execution date is not set, for which plural execution locations are designated, and for which plural execution candidates are designated, as the subject of selection processing (selection subject task information).

The selection processing control unit 122 sets the number of the recognized selection subject task information as a variable N, and makes a counter value c that indicates the number of task information of which the selection processing has been executed "0". The selection processing control unit 122 increases the counter value c by 1 at a point in time where the selection processing of one selection subject task information is completed. The selection processing control unit 122 controls the selection processing unit 120 to perform the selection processing until the counter value c reaches N (that is, the selection processing of the entire selection subject task information is completed).

The execution candidate information acquisition unit 124 acquires the execution candidate information indicating the execution candidate, which is stored in the task information database 200 based on an input from the selection processing control unit 122, and outputs the acquired information to the execution candidate position information acquisition unit 130.

The execution candidate position information acquisition unit 130 acquires the execution candidate position information on the positions of the execution candidates which are designated by the execution candidate information that is input from the execution candidate information acquisition unit 124 of the selection processing unit 120 from the server 400, and outputs the acquired information to the selection processing unit 120. The execution candidate position information is acquired by GPS functions of portable terminals that are carried by the execution candidates, and is transmitted from the portable terminals to the server 400.

The map search unit 140 searches the map information database 300 based on the execution candidate position information acquired by the execution candidate position information acquisition unit 130, which is acquired from the selection processing unit 120, and execution location position information which indicates the position of the execution location that is acquired from the map information database 300. The map search unit 140 searches for a path from each execution candidate to the execution location that is nearest to the execution candidate and acquires the movement distance in the movement distance mode, and acquires the movement time required to move from the current position of each execution candidate to the execution location that is nearest to the execution candidate in the movement time mode, as the map search result. The map search unit 140 outputs the acquired map search result to the selection processing unit 120.

In acquiring the map search result, an execution location and an area that is covered by the execution location may be pre-stored in relation to each other, and if the execution candidate position information is acquired, execution location position information of an execution candidate at the execution location that covers the area, in which the execution candidate position information is included, may be acquired to perform the process. Also, a movement time or a movement distance from each execution candidate to each execution location may be calculated, and the shortest movement time or movement distance may be adopted.

The selection processing execution unit 126 selects the execution location at which a task is executed and the execution candidate that executes the task from plural execution locations and plural execution candidates based on the map search result input from the map search unit 140. Specifically, in the movement distance mode, the selection processing execution unit 126 selects the execution candidate having the shortest movement distance as the execution candidate that executes the task, and selects the execution location that is nearest to the execution candidate as the execution location at which the task is executed. In the movement time mode, the selection processing execution unit 126 selects the execution candidate having the shortest movement time as the execution candidate that executes the task, and selects the execution location that is nearest to the execution candidate as the execution location at which the task is executed.

The notification unit 150 outputs information that indicates the execution location and the execution candidate selected by the selection processing execution unit 126 of the selection processing unit 120 to the display (not illustrated) to display the information. The selection processing control unit 122, for example, increases the counter value c by 1 at the point in time where notification is made by the notification unit 150.

Figure 3:
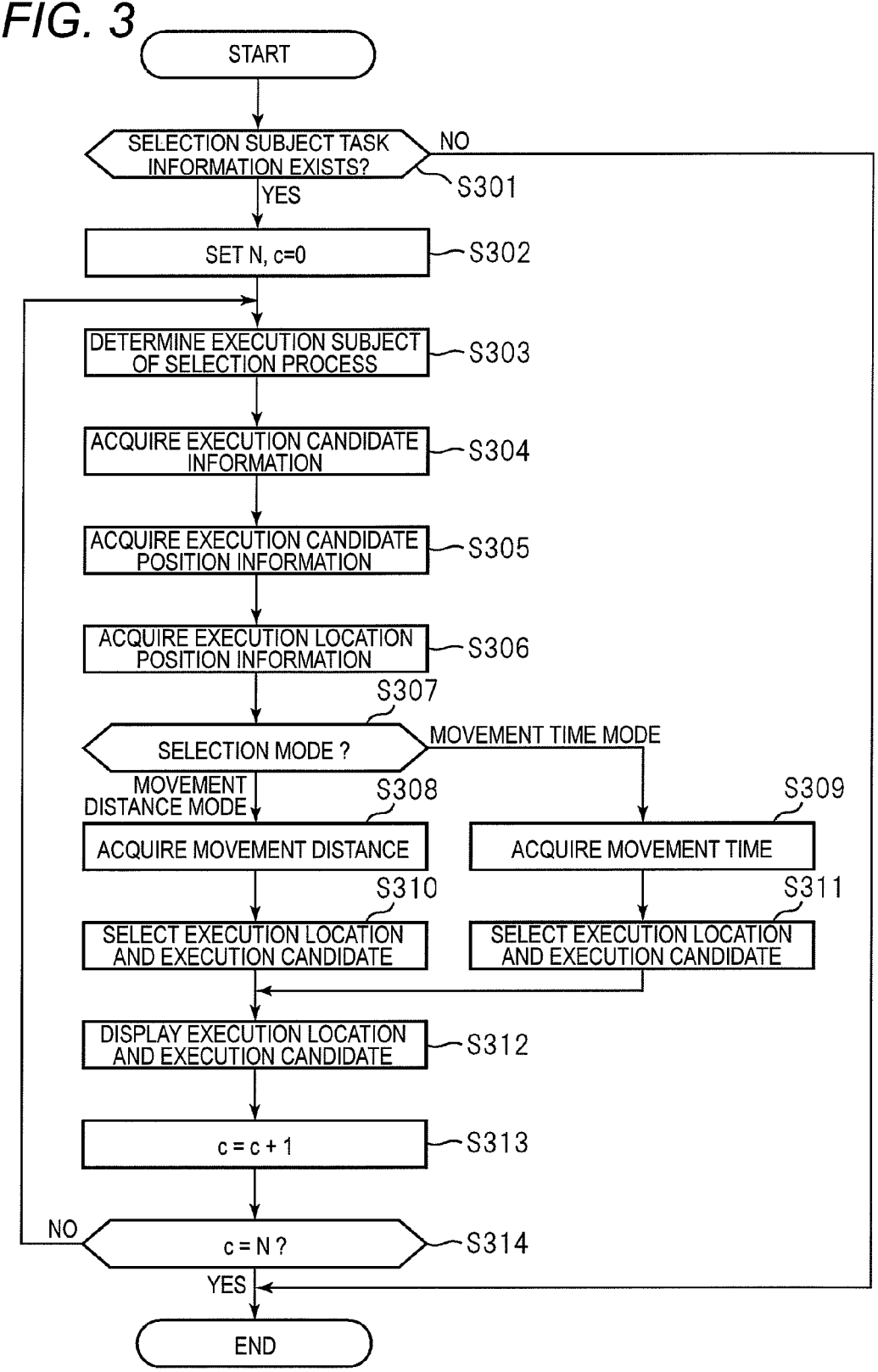
FIG. 3 is a flowchart illustrating a selection process in a task management apparatus according to an embodiment of the invention.

Next, the operation of the task management apparatus 100 will be described using a flowchart. FIG. 3 is a flowchart illustrating the selection process in the task management apparatus 100 according to this embodiment of the invention.

The selection processing control unit 122 of the selection processing unit 120 confirms the existence/nonexistence of the selection subject task information at a predetermined time (S301), and if the selection subject task information exists, it acquires and sets the number as a variable N, and sets the counter value c to "0" (S302). If the selection subject task information does not exist, the selection processing control unit 122 ends the execution candidate selection process.

Next, the selection processing control unit 122 considers one of the selection subject task information as the subject of execution of the selection processing (S303), and starts the selection processing with respect to the subject of execution. First, the execution candidate information acquisition unit 124 acquires the execution candidate information of the subject of execution (S304), and outputs the acquired information to the execution candidate position information acquisition unit 130.

The execution candidate position information acquisition unit 130 acquires the execution candidate position information from the server 400 with respect to the respective execution candidates that are designated by the execution candidate information input in step S304 (S305), and outputs the acquired information to the selection processing unit 120.

If the execution candidate position information acquired in step S305 is acquired from the selection processing unit 120, the map search unit 140 acquires the execution location position information that indicates the position of the execution location from the map information database 300 (S306), and then confirms the selection mode (S307). If the selection mode is the movement distance mode, the map search unit 140 acquires the movement distance by performing a path search from each execution candidate to the task location that is nearest to the execution candidate (S308), and outputs the acquired movement distance to the selection processing execution unit 126 of the selection processing unit 120. If the selection mode is the movement time mode, the map search unit 140 acquires the movement time required for each execution candidate to move from the current position of the execution candidate to the task location that is nearest to the execution candidate (S309), and outputs the acquired movement time to the selection processing execution unit 126.

If the movement distance is acquired in step S308, the selection processing execution unit 126 of the selection processing unit 120 selects the execution candidate and the execution location having the shortest movement distance acquired in step S308 as the execution candidate that performs the task and the execution location at which the task is performed (S310).

If the movement time is acquired in step S309, the selection processing execution unit 126 selects the execution candidate and the execution location having the shortest movement time acquired in step S309 as the execution candidate that performs the task and the execution location at which the task is performed (S311).

If the execution location and the execution candidate are selected in steps S310 and S311, the notification unit 150 outputs information that indicates the selected execution location and execution candidate to the display to display the information (S312).

If notification is made by the notification unit 150, the selection processing control unit 122 increases the counter value c by 1 (S313), and determines whether the counter value c becomes equal to the value N (S314). If the counter value c is equal to N, it means that the selection process for all task information that are subjects of selection process is completed, and thus the selection process in the task management apparatus 100 is completed. If the counter value c is not equal to N, the processing returns to step S303, and the selection process for the task information of which the selection process has not yet been completed is executed as the subject of selection processing.

By the above-described configuration, with respect to a task in which plural execution locations and execution candidates are designated, the execution location and the execution candidate which are suitable to the execution of the task are determined based on the position information of the execution location and the execution candidate.

In this case, the task management apparatus 100 is an information processing apparatus such as a personal computer, is implemented by operating a program that is stored in a memory of the information processing apparatus. This program may be provided by communication or may be stored in a storage medium, such as a CD-ROM, which is readable by a computer.

In the above-described embodiment, a configuration is disclosed, which selects the selection candidate and the execution location having the shortest movement distance in a movement distance mode and selects the execution candidate and the execution location having the shortest movement time in a movement time mode. However, the present invention is not limited thereto, and the configuration may select plural execution candidates and plural execution locations, for example, in the order of their short movement distance or movement time, or may select an execution candidate and an execution location having the movement time or movement distance that is shorter than a predetermined time or distance. Also, the configuration may determine "no execution candidate/execution location concerned" if there is no execution candidate/execution location having the movement time or movement distance that is shorter than a predetermined time or distance. Further, the configuration may be made so that in the step in which the map search unit 140 determines the task location having the shortest movement time or movement distance with respect to the respective execution candidates, the execution candidates having the movement time or movement distance that is longer than a predetermined time or distance are excluded from the subjects of selection performed by the selection processing execution unit 126.

Also, in this embodiment of the invention, a configuration is disclosed, in which confirmation of the task information is performed for each predetermined time (for example, at intervals of one minute) by the selection processing control unit 122. However, the present invention is not limited thereto, and for example, in the configuration, the confirmation may be executed at a designated time, or conditions of the execution time may be set by a task owner in the case of setting the respective task information. Also, the configuration may select designated task information in accordance with an operation of designating the task information or commanding the execution of the selection process in the task management apparatus 100.

Also, means for acquiring the current time may be further installed in the configuration to further set conditions on the time when the task is executed as task information (for example, operation hours of a financial agency for the operation such as deposit of money or the like) and to select the execution candidate in the case where the current time meets the conditions.

Also, in the above-described embodiment, a configuration is disclosed, which performs selection based on a movement time or movement distance. However, the present invention is not limited thereto, and in the case of the configuration based on position information, the movement distance may be a straight distance. Although a configuration that acquires the position information by a GPS function is disclosed, the configuration may acquire the position information in another method. For example, a configuration that receives registration of schedules of action of the execution candidates may be installed, and position information that is assumed from the registered schedules of action may be used in selection processing. Also, a configuration may be provided, which acquires information, which indicates installation places of devices such as information processing devices that are installed in several branches, as positions of the execution candidates by detecting operations performed by the execution candidates.

Also, in the above-described embodiment, a configuration is disclosed, in which information that indicates the selected execution location and execution candidate is displayed on a display to be notified to the task owner. However, the configuration may notify the task owner of the information in another method such as sending of a mail, or may notify the selected execution candidate of the information by e-mail or the like, through a portable terminal that is carried by the execution candidate. Also, if necessary, the configuration may notify the task owner of only any one of the execution location and the execution candidate.

Also, the configuration may set an execution term of the task as the task information, and a configuration that warns the task owner of the term when the time arrives at the predetermined term may be further installed.

Also, the configuration may further store execution status information that indicates execution completion/incompletion of the task as task information that can be referred to by the task management apparatus 100 or the portable terminal carried by the execution candidate, and a configuration that receives an operation for rewriting the execution status information as "execution completed" in the case where the task has been executed by the execution candidate or the like may be installed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A task management apparatus comprising:
  a storage unit in which a plurality of execution locations are stored in relation to a task, the task capable of being performed at any one of the plurality of execution locations;
  a task information acquisition unit that acquires task information which indicates the task to be executed by one of a plurality of execution candidates at any one of the plurality of execution locations;
  an execution location position information acquisition unit that acquires, from the storage unit, execution location position information which indicates respective positions of each of the plurality of execution locations corresponding to the task acquired by the task information acquisition unit;
  an execution candidate position information acquisition unit that acquires execution candidate position information on respective positions of the plurality of execution candidates;
  a map information database that records positions corresponding to the plurality of execution locations;
  a map search unit which uses the plurality of execution locations from the map information database to acquire at least one of the a movement distance and a movement time by determining a path from each execution candidate to one of the plurality of executions locations that is nearest, by at least one of time and distance, to each execution candidate respectively, and
  a selection unit that selects, using a processor, one execution location and one execution candidate, based on respective movement costs of moving each candidate along said path to the execution location nearest to each respective execution candidate from among the plurality of execution locations, wherein the movement costs being calculated from the execution location position information acquired by the execution location position information acquisition unit and the execution candidate position information acquired by the execution candidate position information acquisition unit, wherein the execution candidate position information is acquired by a GPS location of the plurality of execution candidates.

2. The task management apparatus according to claim 1, wherein the execution candidate position information acquisition unit acquires the execution candidate position information on the respective positions of the plurality of execution candidates at each predetermined point in time, and the selection unit selects one execution candidate who executes the task for each predetermined point in time.

3. The task management apparatus according to claim 1, further comprising:

a time information acquisition unit that acquires time information that indicates the current time; and an execution time condition information acquisition unit that acquires execution time condition information which indicates a condition on the time when the task is executed, wherein the selection unit selects one execution candidate who executes the task in the case where the current time which is indicated by the time information is suitable to the condition which is indicated by the execution time condition information.

4. The task management apparatus according to claim 1, wherein the movement costs includes distances from the respective execution candidates to at least one of the plurality of execution locations, respectively, and the selection unit selects one execution location and one execution candidate between which the distance is shortest.

5. The task management apparatus according to claim 1, wherein the movement costs includes movement times which are required for the respective execution candidates to move to at least one of the plurality of execution locations, respectively, and the selection unit selects one execution location and one execution candidate between which the movement time is shortest.

6. The task management apparatus according to claim 1, wherein the execution candidate position information on the respective positions of the plurality of execution candidates includes information which indicates schedules of action of the execution candidates, the execution candidate position information being acquired by the execution candidate position information acquisition unit.

7. The task management apparatus according to claim 1, the selection unit that selects said one execution candidate and said one execution location, based on the respective movement costs of the plurality of execution candidates with respect to a determined execution location for each execution candidate.

8. The task management apparatus according to claim 7, wherein the determined execution location is an execution location from the plurality of execution location that is nearest, by at least one of time and distance, to said one execution candidate.

9. The task management apparatus according to claim 1, wherein the selection unit makes the selection based on the plurality of positions searched by the map search unit.

10. A non-transitory computer-readable medium storing a program that causes a computer to execute task management, the task management comprising:

storing a plurality of execution locations related to a task, the task capable of being performed at any one of the plurality of execution locations;

acquiring task information which indicates the task being executed by one of a plurality of execution candidates at any one of the plurality of execution locations;

acquiring, from the storage unit, execution location position information which indicates respective positions of each of the plurality of execution locations, corresponding to the task acquired by the task information acquisition unit;

acquiring execution candidate position information on respective positions of the plurality of execution candidates; and recording positions corresponding to the plurality of execution locations in a map information database; and searching from the map information database, the plurality of execution locations from the map information database to acquire at least one of a movement distance and a movement time by determining a path from each execution candidate to one of the plurality of executions locations that is nearest, by at least one of time and distance, to each execution candidate respectively, a plurality of positions corresponding to the execution location, and selecting one execution location from the plurality of execution locations at which the task which is indicated by the task information is executed and one execution candidate from the plurality of execution candidates who executes the task, based on respective movement costs of moving each candidate along said path to the execution location nearest to each respective execution candidate from among the plurality of execution locations in case the plurality of execution candidates are moved to the plurality of execution locations, wherein the movement costs being calculated from the acquired execution location position information and the acquired execution candidate position information, wherein the execution candidate position information is acquired by a GPS location of the plurality of execution candidates.

11. The task management apparatus according to claim 1, wherein the plurality of execution candidates carry portable terminal having a GPS function to determine the GPS location of the plurality of execution candidates, and the GPS location is transmitted from the portable terminal to the execution location position information acquisition unit.

12. The task management apparatus according to claim 1, wherein the map search unit acquires, for each execution candidate, at least one of a movement distance and a movement time required to move from a current position to an execution location nearest to the execution candidate.

13. The task management apparatus according to claim 1, wherein the execution location position information is information which indicates a store location.

14. The non-transitory computer-readable medium according to claim 10, further comprising:

wherein the selection unit makes the selection based on the plurality of positions searched by the map search unit.

* * * * *